United States Patent
Cheng et al.

(10) Patent No.: US 6,393,008 B1
(45) Date of Patent: May 21, 2002

(54) CONTROL STRUCTURES FOR CONTENTION-BASED PACKET DATA SERVICES IN WIDEBAND CDMA

(75) Inventors: Mark Cheng, Solana Beach, CA (US); Zhi-Chun Honkasalo, Vantaa (FI)

(73) Assignee: Nokia Movile Phones Ltd., Espoo (FI)

( * ) Notice: Subject to any disclaimer, the term of this patent is extended or adjusted under 35 U.S.C. 154(b) by 0 days.

(21) Appl. No.: 09/069,369

(22) Filed: Apr. 29, 1998

Related U.S. Application Data

(60) Provisional application No. 60/068,701, filed on Dec. 23, 1997.

(51) Int. Cl.[7] .............................. H04Q 7/24; H04J 3/24
(52) U.S. Cl. ........................ 370/338; 370/349; 370/409
(58) Field of Search ................................. 370/329, 338, 370/342, 352–357, 431, 441, 465, 468, 469, 328, 401, 409, 349

(56) References Cited

U.S. PATENT DOCUMENTS

| | | | | |
|---|---|---|---|---|
| 5,533,019 A | * | 7/1996 | Jayapalan | 370/352 |
| 5,729,534 A | * | 3/1998 | Jokinen et al. | 370/280 |
| 5,768,267 A | * | 6/1998 | Raith et al. | 370/329 |
| 5,790,551 A | * | 8/1998 | Chan | 370/458 |
| 5,818,829 A | * | 10/1998 | Raith et al. | 370/347 |
| 5,859,840 A | * | 1/1999 | Tiedemann, Jr. et al. | 370/335 |
| 5,978,368 A | * | 11/1999 | Hjelm et al. | 370/347 |
| 6,167,270 A | * | 12/2000 | Rezaiifar et al. | 370/331 |

* cited by examiner

*Primary Examiner*—Chau Nguyen
*Assistant Examiner*—Andy Lee
(74) *Attorney, Agent, or Firm*—Brian T. Rivers

(57) ABSTRACT

A method and system for transmitting packet data over a cellular telecommunications network is presented. A novel medium access control (MAC) logical layer is implemented between a service option layer and multiplex sublayer. The MAC layer handles the multiple accesses of packet users over selected dedicated traffic channels. The MAC layer provides a multiple access control function for packet data users only. Users requiring only circuit switched services (voice calls) are not serviced through the MAC layer multiple access control function. If a user has simultaneous circuit switched and packet data services operating, the MAC layer multiple access control function handles the packet data services, while the circuit switched services are handled simultaneously by bypassing the MAC layer multiple access control function.

14 Claims, 4 Drawing Sheets

CONTROL STRUCTURES FOR CONTENTION-BASED PACKET DATA SERVICES IN WIDEBAND CDMA

CLAIM OF PRIORITY FROM A COPENDING PROVISIONAL PATENT APPLICATION

Priority is herewith claimed under 35 U.S.C. § 119(e) from copending Provisional Patent Application 60/068,701, filed Dec. 23,1997, entitled "Control Structures for Contention-Based Packet Data Services in Wideband CDMA," by Zhi-Chun Honkasalo and Mark Cheng. The disclosure of this Provisional Patent Application is incorporated by reference herein in its entirety.

FIELD OF THE INVENTION

This invention relates to packet data services in telecommunications systems, and, more particularly, to control structures for contention-based packet data services in cellular telecommunications systems.

BACKGROUND OF THE INVENTION

Major cellular system types include those operating according to the Global Services for Mobile (GSM) Standard, the TIA/EIA/IS-95 Mobile Station-Base Station Compatibility Standard for Dual Mode Wide Band Spread Spectrum Cellular System (IS-95A), the TIA/EIA/IS-136 Mobile Station-Base Station Compatibility Standard (IS-136), and the TIA/EIA 553 Analog Standard (AMPS/TACS). Other major cellular systems include those operating in the personal communications system (PCS) band according to the IS-95 based ANSI-J-STD-008 1.8–2.0 GHz standard or those operating according to the GSM based PCS1900 (1900 MHz frequency range) standard. IS-95A is currently being updated, as IS-95B, in the document TIA/EIA SP-3693.

Currently, each of the major cellular system standards bodies is implementing data services into its digital cellular specifications. A packet data service specification has been finalized for GSM and IS-95A. Packet data service specifications compatible with the IS-136 and IS-95B standards are also being prepared.

In IS-95A the packet data service (IS-707) is implemented on a single channel, which is used on a make and break basis for multiple connections over the duration of a packet data session. Once a channel is seized, it is held by a call until it is timed out. The IS-707 scheme is inefficient and does not allow efficient utilization of channels by multiple packet data users. In the IS-95B packet data service (IS-707A), a fundamental channel is assigned and held similarly to the IS-95A fundamental channel, but a packet data call may also be assigned one or more supplemental channels, as necessary and as available, by a call control function. The supplemental channel packet function is handled by the Medium Access Control (MAC) function of the base station (BS). The packet data service is similar to true contention-based MAC principles as far as the handling of the supplemental channels. Supplemental channels are allocated among various users by the MAC function according to the relative fill levels of buffers set up for each call. Because the fundamental channel provides chip level synchronization information for the supplemental channels, physical layer access delays to supplemental channels may actually be reduced as compared to contention-based access schemes. The BS monitors all packet users buffers regularly and allows the supplemental channels to be shared by the users in a round-robin fashion. On the reverse link, the BS monitors requests from all the mobiles using the packet data service and allocates or de-allocates the supplemental channels accordingly.

A problem with IS-707 and IS-707A-based packet data services lies in the inefficiency caused by use of the fundamental channel. Assigning a fundamental channel to each packet call automatically takes 9.6 kbps of resources from the total resources available. Each user assigned a fundamental channel requires dedicated BS hardware resources until the fundamental channel is timed out. If the time-out period is shortened, this may cause a load in terms of network signaling and circuit switching. Overall, this scheme may lead to excessive packet delay due to call setup delays or excessive blocking as load increases and fundamental channels become the dominant portion of total resource consumption. At the point where excessive blocking occurs, a true contention-based system would allow more effective sharing of limited resources.

OBJECTIVES OF THE INVENTION

It is an object and advantage of this invention to provide an efficient method and system for transmitting packet data over a cellular telecommunications network that overcomes the foregoing and other problems.

Another object and advantage of this invention is to provide a method and system for handling multiple access of packet data users over dedicated traffic channels in a manner that reduces the system overhead required to support multiple users and reduces access delay of a packet user in obtaining use of a channel.

A further object and advantage of this invention is to provide a method and system for handling multiple access of packet data users in a manner that allows packet users having packet switched data, and/or packet users having simultaneous circuit switched (voice calls) and packet switched data to be handled under the control of a single control structure.

SUMMARY OF THE INVENTION

A method and system for transmitting packet data over a cellular telecommunications network is presented. A novel medium access control (MAC) logical layer is implemented between a service option layer and multiplex sublayer. The MAC layer handles the multiple accesses of packet users over selected dedicated traffic channels. The MAC layer provides a multiple access control function for packet data users only. Users requiring only circuit switched services (voice calls) are not serviced through the MAC layer multiple access control function. If a user has simultaneous circuit switched and packet data services operating, the MAC layer multiple access control function handles the packet data services, while the circuit switched services are handled simultaneously by bypassing the MAC layer multiple access control function.

In an embodiment of the invention, the MAC layer is implemented in a cellular telecommunications system utilizing a fundamental channel and/or one or more supplemental channels for each of the mobile-to-base station (reverse) and base-to-mobile station (forward) links. The MAC layer defines the radio resource request/management (data rate control) functionality in the mobile station and base station for efficient packet transmission. For users who already have a physical circuit with the network, e.g., those users already having a fundamental channel for voice but needing additional traffic resources for packet data, MAC is responsible for allocating additional supplemental channels as necessary or data rate requests/assignments for the purpose of transporting large packets. For users who do not already have a physical circuit with the network, the MAC layer is responsible for establishing a MAC layer connection between the mobile station and base station and allocating the physical layer connections on both the fundamental and supplemental channels.

The MAC layer multiple access control function interfaces between the service option layer and the system multiplex layer, i.e., TCP/IP packets arriving from a network layer are handled by the service option layer where they are encapsulated into point-to-point protocol (PPP) packets and passed to the MAC layer. As an alternative, the function of encapsulating the packets into RLP frames may be performed in the service option layer before the packets are passed to the MAC layer. The MAC layer processes the packets into radio link protocol (RLP) frames and provides a MAC layer multiple access control function that processes the data and passes the data to the system multiplex layer. The system multiplex layer handles the system specified, multiplexing and formatting for transmission on the traffic channels of physical air interface. Circuit switched service options interface to the system multiplex layer without handling through the multiple access control function layer of the MAC. The interface for the circuit switched service options may be directly to the multiplex layer or be through the MAC layer but not through the multiple access control function of the MAC layer. The multiplex layer may be implemented under one common control function or, as an alternative, may be split into two separately functioning layers, with one handling circuit switched service options and the other handling packet data service options.

DETAILED DESCRIPTION OF THE INVENTION

Figure 1:
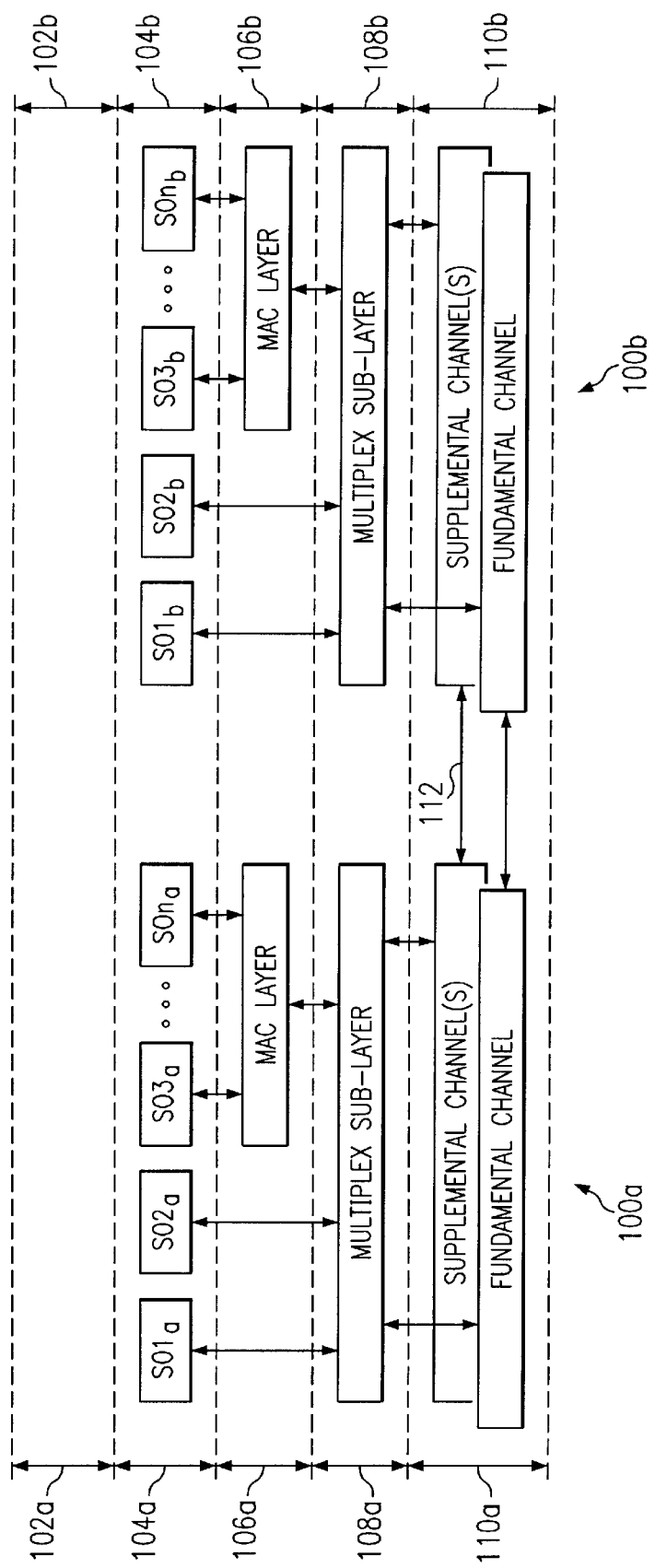
FIG. 1 illustrates the protocol layer diagram for a cellular system operating according to an embodiment of the invention.

Referring now to FIG. 1, therein is illustrated the protocol layer diagram 100, for a cellular system operating according to an embodiment of the invention. FIG. 1 illustrates the protocol layer for a mobile station (MS) 100a and the protocol layer for a base station (BS) 100b. In the embodiment of the invention, a medium access control (MAC) protocol layer has been implemented for control of packet data applications. Network layer 102a and 102b represent the source and destination of input for circuit switched voice and data calls and data packets for packet switched calls for MS 100a and BS 100b, respectively. Service Option layer 104a (104b) includes Service Options SO1a . . . SOna (SO1b . . . SOnb). SO1a (SO1b) and SO2a (SO2b) are circuit switched applications that transfer data between multiplex sublayer 108a (108b) and network layer 102a (102b). SO3a(SO3b) and SO4a (SO4b) are packet data switched applications that transfer packet data between MAC layer 106a (106b) and network layer 102a (102b). There may be any number of packet data switched applications and/or circuit switch applications open at any time. Multiplex sublayer 108a (108b) controls the multiplexing of data packets from MAC layer 106a (106b) and circuited switched voice and data calls from secure option layer 104a (104b) from and onto the traffic channels of physical layer 110a (110b). A fundamental traffic channel and/or at least one supplemental channel are used to carry transmissions over air interface 112 between MS 100a and BS 100b.

Figure 2A:
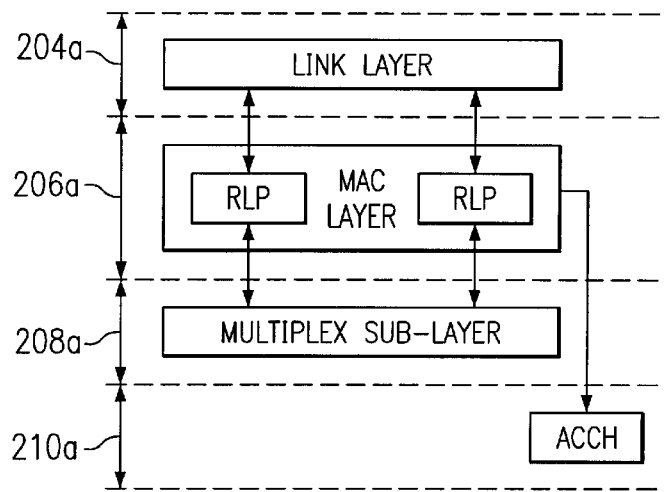
FIGS. 2A and 2B illustrate alternative implementations of the medium access control (MAC) layer of FIG. 1.
Figure 2B:
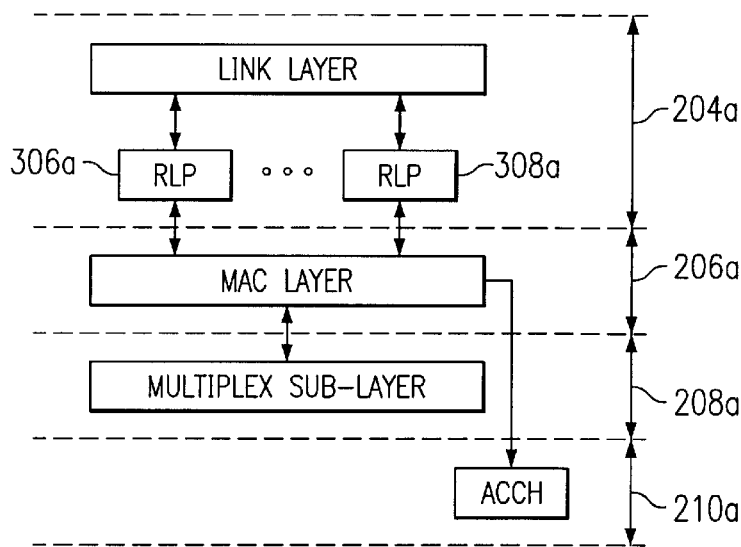

Referring now to FIGS. 2A and 2B, therein are figures illustrating alternative implementations of MAC layers 106a and 106b of FIG. 1.

FIG. 2A illustrates an implementation having the radio link protocol (RLP) layer implemented within the MAC layer according to the embodiment of the invention. In the implementation of FIG. 2A, the RLP has direct access to the multiplex sublayer. The functionality of the RLP and MAC are separated even though the combined RLP/MAC has a single interface to the multiplex sublayer. The MAC layer controls the resource allocation for each RLP, and each RLP is monitored and controlled by the MAC for data frame transmissions to the multiplex layer. In this implementation no additional information is needed to be added to the MAC frame header.

FIG. 2B illustrates an implementation having the RLP layer implemented separately from the MAC. In this alternative implementation, MAC traffic is present if one or more packet services are connected, and MAC frames may carry packet traffic from multiple sources. Multiplex sublayer 108a handles primary, secondary and MAC traffic. This reduces the overhead of multiplex sublayer frame header in the case where there are more than one packet applications connected.

Figure 2C:
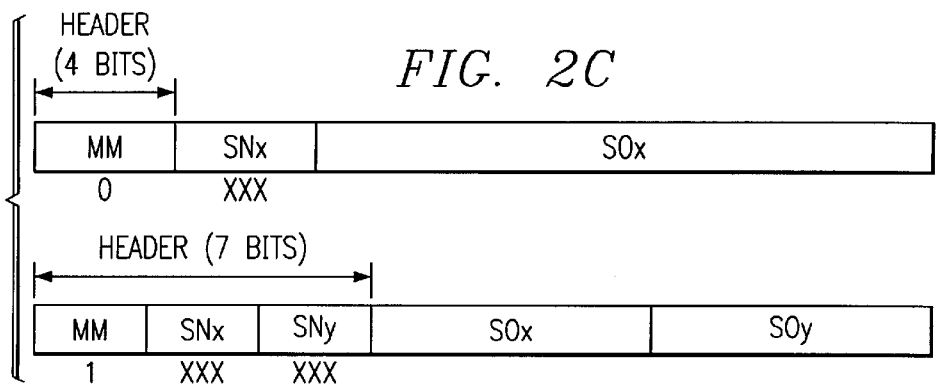
FIG. 2C illustrates an implementation of the medium access control (MAC) layer data frame for the MAC layer of FIG. 2B.

FIG. 2C illustrates a MAC header for the alternative embodiment of FIG. 2B. In FIG. 2C, a MAC header of four bits is able to accommodate eight concurrent packet applications. The MAC layer 106a (106b) generates one or more MAC frames to the multiplex layer 108a (108b). For packet data services, up to two RLP frames may be mapped into a single MAC frame. Synchronous protocol is used, i.e., every predetermined x ms. MAC layer 108a (108b) generates or receives one or more MAC frames. The MM field indicates the multiplex mode, $Sn_x$ indicates the service option ID (x=0–7). $Sn_x$ is a three-bit field that can represent up to eight concurrent packet service connections. $SO_x$ carries the data for $Sn_x$. MM set to 0 indicates that the MAC frame includes the frame of one packet service. Because the MAC can locate the allocated traffic channel capacity on a frame-by-frame basis among all active packet services, mixing of packet traffic within a frame is not required. This reduces the header overhead in the MAC layer. One simple mode (MM=1) needs to be supported in the case where one packet service option does not have sufficient data to fill the complete MAC frame. In this case, data for two service options, $Sn_x$, and $Sn_y$, are carried in the MAC frame. The mixing status on MAC layer is transparent to multiplex sublayer and the total number of concurrent connections can be expanded to a larger number without requiring excessive overhead in the multiplex sublayer header. In the embodiment of FIGS. 2B and 2C, there can be up to two circuit switched connections together with up to eight packet service options open concurrently with one mobile.

In operation of MS 100a (BS 100b), (TCP) or (IP) packets are received from network layer 102a (102b) at Service Option layer 104a (104b). At Service Option layer 104a (104b), the packets are encapsulated into point-to-point (PPP) protocol packets and passed onto MAC layer 106a (106b). MAC layer 106a (106b) provides the RLP function and handles the multiple access of packet users over traffic channels that the MAC layer 106a (106b) establishes through multiplex sublayer 108a (108b). MAC layer 106a (106b) in both MS 100a and BS 100b establishes the necessary traffic channels by communicating with a scheduling function in BS 100b that handles the overall allocation of fundamental and supplemental traffic channels. The allocation of traffic channels among multiple users may be dynamically changed by the scheduling function, depending upon the current load conditions of the network.

Figure 4:
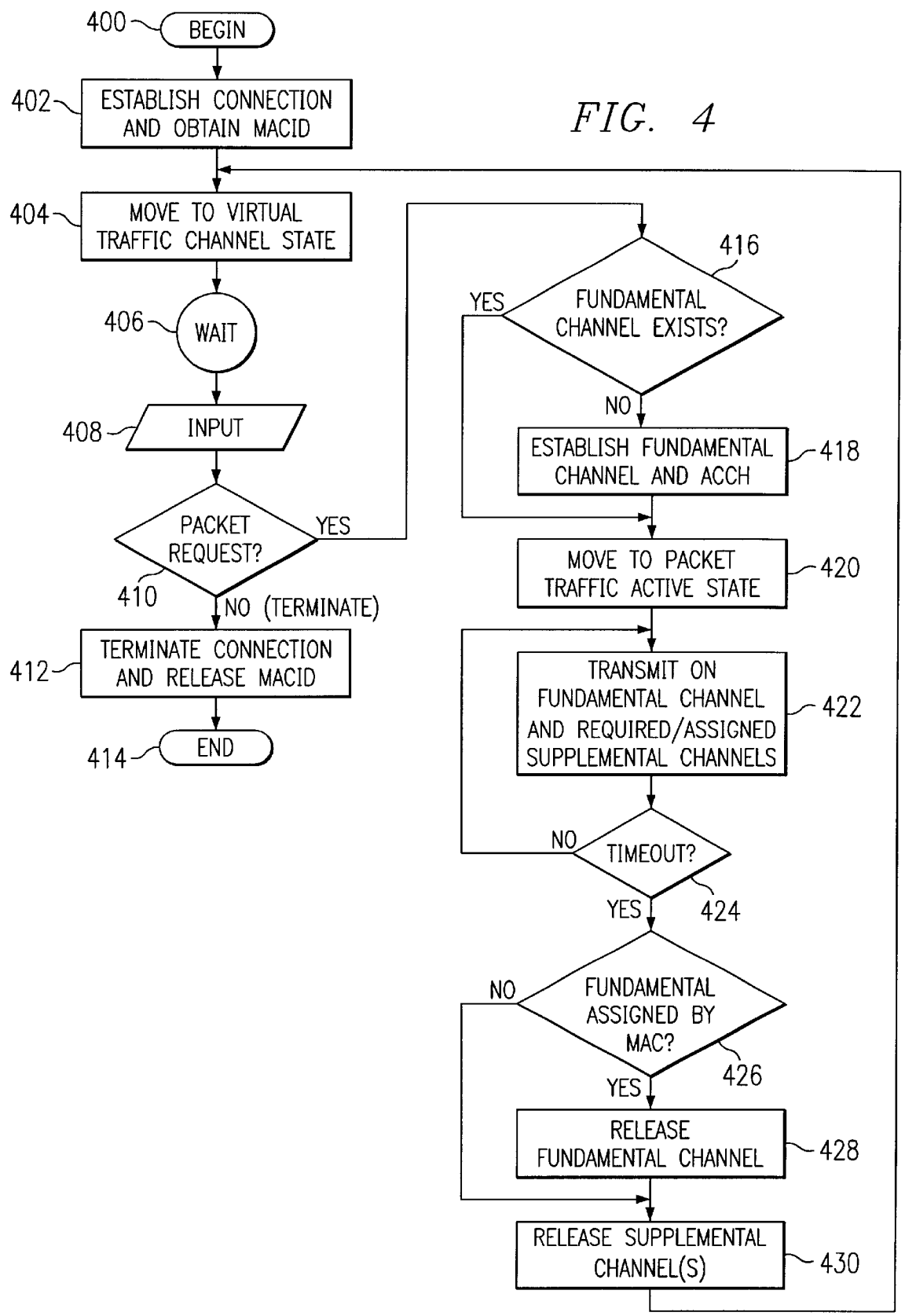
FIG. 4 is a flow diagram illustrating process steps performed by a medium access control (MAC) layer according to an embodiment of the invention.

Referring now to FIG. 4, therein is a flow diagram showing process steps performed by the MAC layer 106a and 106b of FIG. 1. The process of FIG. 4 will be described with reference to MS 100a and MAC layer 104a. The process is the same from the viewpoint of MS 100a and BS 100b where a communication between a single MS 100a and BS 100b is considered. The fundamental channel is a symmetric connection in both directions. The number of supplemental channels allocated on the forward and reverse links may differ, depending on the data rate and resources available.

When communications between multiple mobile stations are considered, MAC layer 106b of BS 100b may be considered to always be in the active state, monitoring and controlling allocation of channels for communications with all mobile stations involved in packet data calls with BS 100b. MAC layer 106a has two control modes. When a packet data user has previously set up a circuit switched fundamental channel (e.g., for a voice call) and needs additional traffic subchannels for packet data traffic, MAC layer 106a functions to control the subchannel request and assignment of supplemental channels for packet data transmissions. When a packet data user needs traffic channels for packet data traffic and no circuit switched channel is needed, MAC layer 106a functions to set up the physical layer connections in a timely manner on the necessary fundamental and/or supplemental channels.

The MAC layer multiple access control process begins at step 400, when Service Option layer 104 needs to establish a connection for a packet data service option. Link layer 104a receives TCP/IP packets from network layer 102a and encapsulates the data into PPP packets. MAC layer 106a then places the PPP packets into RLP frames with the MAC layer RLP function. At step 402, MAC layer 106a establishes a connection via service negotiation with MAC layer 106b of BS 102 and obtains a MAC_ID. The MAC_ID is an identification number assigned to each mobile station using packet data services by BS 100b for MAC control. Next, at step 404, the MAC function of MAC layer 106a moves to the virtual traffic channel state. In the virtual traffic channel state, although a MAC_ID has been assigned to MS 100 for one or more packet data service options, no physical layer 110a (110b) traffic channel has yet been allocated for the packet data service options. If MS 100a was previously assigned a fundamental channel and is involved in a call simultaneously with the packet data service option requests, a circuit switched connection is realized over the fundamental traffic channel. If MS 100 was not previously assigned a fundamental channel, no traffic channel is opened. On the forward link (BS to MS) a dedicated MAC control channel MAC_CCH is kept open and shared by all mobile stations having a valid MAC_ID. The MAC_CCH functions to broadcast control information to mobile stations holding a valid MAC_ID. Control messages may be MAC_ID specific or common to more than one MAC_ID.

If MS 100 is in the virtual traffic connection state and is also in the normal circuit switched handoff region, it needs to establish multiple virtual connections, each connection associated with its own MAC_ID and a separate base station. These multiple base stations will be placed in the "virtual active" set.

After moving into the virtual traffic channel state in step 404, the MAC function of MAC layer 106a moves to the wait state of step 406. While in the virtual traffic channel connection wait state of step 406, the MAC function 106a may receive a packet request or a terminate order.

If a packet request indicating that a service option of link layer 104a has packet data to transmit is received at step 406, the MAC function of MAC layer 106a moves to step 416. At step 416, it is determined if a fundamental channel exists for MS 106a, i.e., if a fundamental channel has already been assigned for a circuit switched connection call in which MS 102 is engaged. If it is determined that a fundamental channel does not already exist, the MAC layer function moves to step 418. At step 418, a fundamental channel connection including an associated ACCH is established symmetrically on both the forward and reverse links between MS 100 and BS 102. If, however, at step 416 it is determined that a fundamental channel already exists, the MAC layer function moves to step 420 without establishing another fundamental channel.

At step 420, the MAC layer function moves to the packet traffic active state. In the packet traffic active state, the MAC layer function requests supplemental channels as needed over the ACCH for the packet request received from link layer 102a. MAC layer 204a then receives supplemental channel assignments and begins transmitting on the fundamental channel and the assigned supplemental channels. When packet data transmission from MS 100 to BS 102 have been inactive, MAC layer 204a will determine, at step 424, if the reverse link packet data inactivity timer has timed out. If packet data transmissions have been inactive for a predetermined period of time, it will be determined that the inactivity timer has timed out, and the MAC layer function will move to step 426. Otherwise, if the inactivity has not timed out, the MAC layer function remains in the transmit state of 422.

At step 426, it is determined if the fundamental channel was assigned by the MAC layer function 106a at step 418. If it is determined that the fundamental channel was established at step 418, the process moves to step 428 where the fundamental channel is released. The process then moves to step 430. If, however, at step 426, it is determined that the fundamental channel was not assigned at step 418, MS 100 is also involved in a circuit switched call and the process moves to step 430 without releasing the fundamental channel.

At step 430, the process releases the supplemental channels that were assigned at step 422 and then moves back to the virtual traffic channel state of step 404 and step 406. From step 406, the MAC layer function will continue in the wait state until a packet request or terminate virtual traffic channel connection input is received at step 408. The process will then continue as previously described for step 410.

Figure 3:
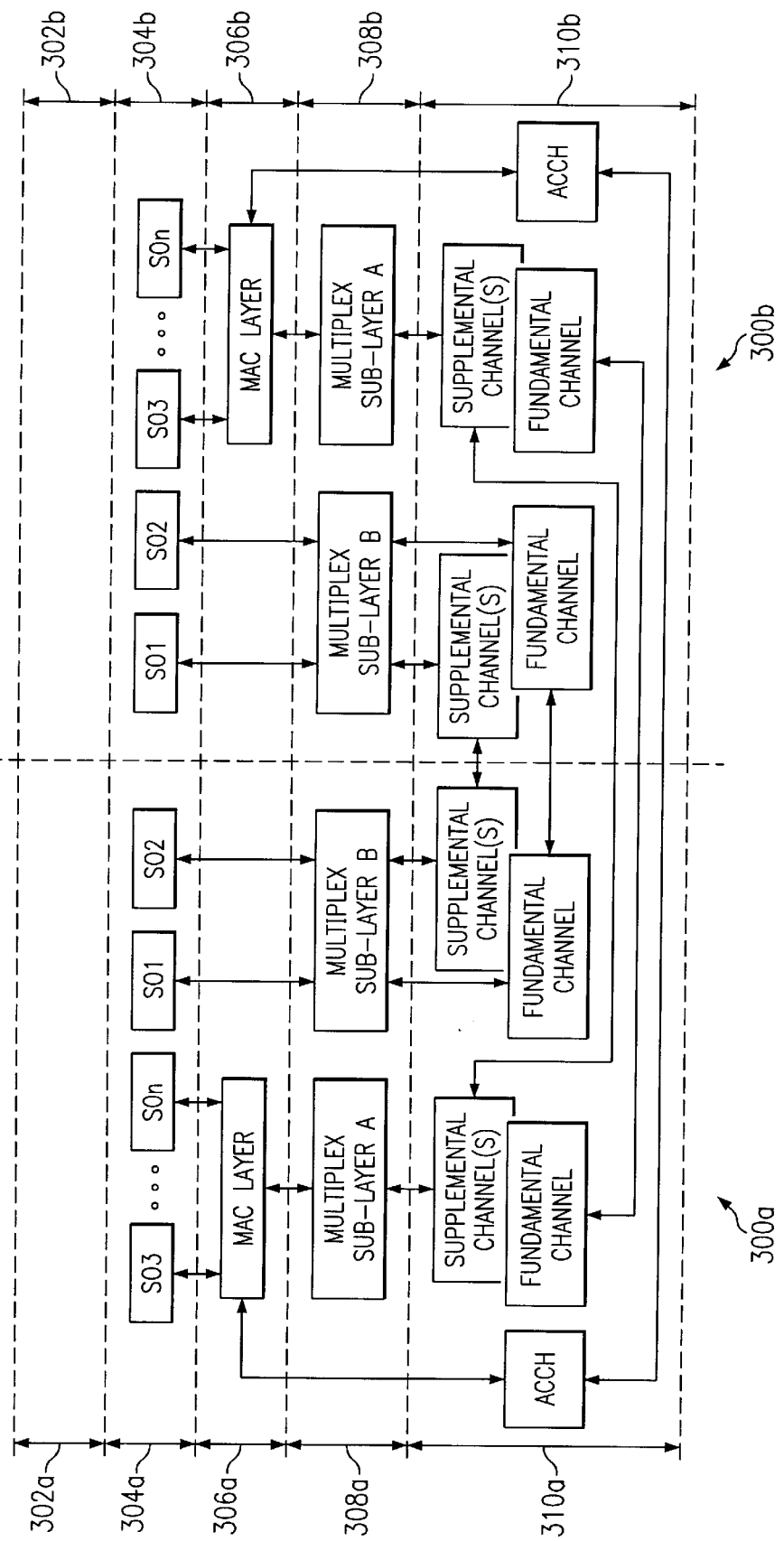
FIG. 3 illustrates the protocol layer diagram for a cellular system operating according to an alternative embodiment of the invention.

Referring now to FIG. 3, therein is an alternative embodiment of a control structure according to the invention. MS 300a and BS 300b of FIG. 3 correspond to MS 100a and BS 100b of FIG. 1. Layers 302a–310a and 302b–310b correspond to layers 102a–110a and 102b–110b, respectively, of FIG. 1. In FIG. 3 multiplex layer 308a (308b) has been modified to provide separate and independent multiplex layer control, multiplex layer B, for circuit switched service options, SO1a and SO2a (SO1b and SO2B), and multiplex layer A for packet data switched service options SO3a . . . SOna (SO3b . . . SOnb). In the embodiment of FIG. 3, circuit switched and packet switched portions of traffic may coexist side-by-side and are handled through separate controls and occupy separate traffic channels. For packet switched data a fundamental traffic channel may or may not exist depending on whether or not the mobile has already set up a circuit switched call. If MAC layer 306a (306b) only assigns supplemental channels to carry data packets, then the multiplex layer A does not generate any fundamental traffic channel frames. The MAC layer 306b keeps data on which mobile stations already have an existing fundamental channel. When data packets are transmitted to these mobile stations, MAC layer 306b only allocates supplemental channels for transmission. For mobile station access, MS 300a sends an access request to MS 306b via ACCH for necessary supplemental channel assignment. If a circuit switched connection is released during a packet connection, MAC layer 306b removes the mobile station involved from the list of mobile stations having an existing fundamental channel. The embodiment of FIG. 3 allows traffic to be divided into circuit switched and packet switched data groups and be multiplexed within each group. In that embodiment it is not necessary that the multiplex layer 308a (308b) have knowledge of the upper layer connections in order to coordinate assignment of supplemental channels between the MAC layer and link layer.

Although the method and apparatus of the present invention has been illustrated and described with regard to presently preferred embodiments thereof, it will be understood that numerous modifications and substitutions may be made to the embodiments described and that numerous other embodiments of the invention may be implemented without departing from the spirit and scope of the invention as defined in the following claims.

What is claimed is:

1. A method for establishing packet data services in a telecommunications system, said method comprising the steps of:

establishing a MAC layer connection between a first and second transceiver, said second transceiver associated with one of a plurality of base stations;

establishing a plurality of virtual connections for said MAC layer connection, each of said plurality of virtual connections established with one of said plurality of base stations and each associated with a separate MAC_ID;

receiving packet data at said MAC layer in said first transceiver, said packet data received from a ink layer;

determining, in response to receiving said packet data, whether a first traffic channel from said first transceiver to said second transceiver has been established for carrying circuit switched communications between a multiplex layer of said first transceiver and a multiplex layer of said second transceiver prior to establishment of said MAC layer connection; and if it is so determined, establishing at least one second traffic channel between said multiplex layer of said first transceiver and said multiplex layer of said second transceiver, controlling multiple access of said packet data to said multiplex layer of said first transceiver through said MAC layer, and multiplexing said circuit switched communications and said packet data on said first traffic channel and said packet data on said at least one second traffic channel through said multiplex layer;

else, if it is determined that a first traffic channel has not been established, establishing a first traffic channel and at least one second traffic channel between said multiplex layer of said first transceiver and said multiplex layer of said second transceiver, controlling multiple access of said packet data to said multiplex layer through said MAC layer, and multiplexing said packet data onto said first traffic channel and said at least one second traffic channel through said multiplex layer.

2. The method of claim 1, wherein said multiplex layer of said first transceiver and said multiplex layer of said second transceiver each comprise a single multiplex layer and wherein said single multiplex layer of said first transceiver multiplexes said circuit switched communication and said packet data onto a single set of channels comprising said first traffic channel and said at least one second traffic channel.

3. The method of claim 1, wherein said multiplex layer of said first transceiver and said multiplex layer of said second transceiver each comprise a first multiplex layer and a second multiplex layer and wherein said first multiplex layer of said first transceiver multiplexes said circuit switched communications onto a first set of channels, and said second multiplex layer of said first transceiver multiplexes said packet data onto a second set of channels.

4. The method of claim 3, wherein said first set of channels comprises said first traffic channel and said second set of channels comprises said at least one second traffic channel.

5. The method of claim 1, wherein said MAC layer comprises a radio link protocol (RLP) layer.

6. The method of claim 1, wherein said service option protocol layer comprises a radio link protocol (RLP) layer.

7. An apparatus for establishing packet data services in a telecommunications system, said apparatus comprising:

means for establishing a MAC layer connection between a first and second transceiver, said second transceiver associated with one of a plurality of base stations;

means for establishing a plurality of virtual connections for said MAC layer connection, each of said plurality of virtual connections established with one of said Plurality of base stations and each associated with a separate MAC_ID means for receiving packet data at said MAC layer in said first transceiver, said packet data received from a link layer;

means for determining, in response to receiving said packet data in said means for receiving, whether a first traffic channel from said first transceiver to said second transceiver has been established for carrying circuit switched communications between a multiplex layer of said first transceiver and a multiplex layer of said second transceiver prior to establishment of said MAC layer connection; and means for establishing, in response to a positive determination in said means for determining, at least one second traffic channel between said multiplex layer of said first transceiver and said multiplex layer of said second transceiver, said means for establishing further comprising means for controlling multiple access of said packet data to said multiplex layer of said first transceiver through said MAC layer, and means for multiplexing said circuit switched communications and said packet data on said first traffic channel and said packet data on said at least one second traffic channel in said multiplex layer; and means for establishing, in response to a negative determination in said means for determining, a first traffic channel and at least one second traffic channel between said multiplex layer of said first transceiver and said multiplex layer of said second transceiver, said means for establishing further comprising means for controlling multiple access of said packet data to said multiplex layer in said MAC layer, and means for multiplexing said packet data onto said first traffic channel and said at least one second traffic channel in said multiplex layer.

8. The apparatus of claim 7, wherein said multiplex layer of said first transceiver comprises a single multiplex layer and wherein said means for multiplexing said circuit switched communication and said packet data multiplexes said circuit switched communication and said packet data onto a single set of channels comprising said first traffic channel and said at least one second traffic channel.

9. The apparatus of claim 7, wherein said multiplex layer of said first transceiver comprises a first multiplex layer and a second multiplex layer and wherein said means for multiplexing said circuit switched communications and said packet data comprises means for multiplexing said circuit switched communications onto a first set of channels, and means for multiplexing said packet data onto a second set of channels.

10. The apparatus of claim 9, wherein said first set of channels comprises said first traffic channel and said second set of channels comprises said at least one second traffic channel.

11. The apparatus of claim 7, wherein said MAC layer comprises a radio link protocol (RLP) layer.

12. The apparatus of claim 7, wherein said service option protocol layer comprises a radio link protocol (RLP) layer.

13. A method for establishing packet data services in a telecommunications system, said method comprising the steps of:

establishing a MAC layer connection between a first and second transceiver, said second transceiver associated with one of a plurality of base stations;

placing said MAC layer connection in a virtual traffic channel state, wherein said virtual traffic channel state comprises a plurality of virtual connections, each associated with its own MAC_ID and each associated with one of said plurality of base stations; and receiving packet data at said MAC layer in said first transceiver and creating a physical traffic channel between a multiplex layer of said first transceiver and a multiplex layer of said second transceiver, wherein said physical traffic channel is associated with a virtual connection of said plurality of virtual connections.

14. An apparatus for establishing packet data services in a telecommunications system, said apparatus comprising:

means for establishing a MAC layer connection between a first and second transceiver, said second transceiver associated with one of a plurality of base stations;

means for placing said MAC layer connection in a virtual traffic channel state, wherein said virtual traffic channel state comprises a plurality of virtual connections, each associated with its own MAC_ID and each associated with one of said plurality of base stations; and means for receiving packet data at said MAC layer in said first transceiver and creating a physical traffic channel between a multiplex layer of said first transceiver and a multiplex layer of said second transceiver, wherein said physical traffic channel is associated with a virtual connection of said plurality of virtual connections.

* * * * *